US012289718B2

(12) United States Patent
Wu et al.

(10) Patent No.: US 12,289,718 B2
(45) Date of Patent: Apr. 29, 2025

(54) METHOD AND DEVICE IN A NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 417 days.

(21) Appl. No.: 17/726,550

(22) Filed: Apr. 22, 2022

(65) Prior Publication Data

US 2022/0248418 A1     Aug. 4, 2022

Related U.S. Application Data

(63) Continuation of application No. PCT/CN2021/077545, filed on Feb. 24, 2021.

(30) Foreign Application Priority Data

Feb. 25, 2020   (CN) .......................... 202010116820.2

(51) Int. Cl.
*H04W 72/12*     (2023.01)
*H04L 5/00*       (2006.01)
(Continued)

(52) U.S. Cl.
CPC .......... *H04W 72/12* (2013.01); *H04L 5/0055* (2013.01); *H04L 5/0091* (2013.01); *H04W 52/54* (2013.01); *H04L 1/1858* (2013.01)

(58) Field of Classification Search
CPC ................. H04L 1/0001; H04L 1/1858; H04L 2001/0097; H04L 5/0023; H04L 5/0035;
(Continued)

(56) References Cited

U.S. PATENT DOCUMENTS 12,101,267 B2 *  9/2024  Matsumura .......... H04B 7/0695
2019/0115996 A1   4/2019  Wu
(Continued)

FOREIGN PATENT DOCUMENTS

CN     110535601 A    12/2019
WO     2019109345 A1   6/2019
(Continued)

OTHER PUBLICATIONS

Khoshnevisan et al., "Details of PUCCH Repetition With Different Beams", U.S. Appl. No. 62/878,698, filed Jul. 25, 2019, Total pp. 66 (Year: 2019).*

(Continued)

*Primary Examiner* — Shah M Rahman

(57) ABSTRACT

A method and a device in a node for wireless communications are disclosed in the present disclosure. A first node receives a first information block set, receives a first signaling and a first signal, and transmits a first bit block in a first radio resource block. The first information block set is used to activate a first information element and a second information element out of N information elements; when the first radio resource block only comprises one resource sub-block, only one of the first information element and the second information element is used to determine a spatial relation of the first radio resource block; when the first radio resource block comprises K resource sub-blocks, K being a positive integer greater than 1, the first information element is used to determine a spatial relation of at least one resource sub-block in the first radio resource block.

20 Claims, 6 Drawing Sheets

(51) Int. Cl.
*H04W 52/54* (2009.01)
*H04L 1/1829* (2023.01)

(58) Field of Classification Search
CPC .... H04L 5/0055; H04L 5/0091; H04W 52/54; H04W 72/12; Y02D 30/70
See application file for complete search history.

(56) References Cited

U.S. PATENT DOCUMENTS

| | | |
|---|---|---|
| 2019/0190669 A1 | 6/2019 | Park |
| 2020/0008156 A1* | 1/2020 | Yin .................. H04L 1/1858 |
| 2020/0205150 A1* | 6/2020 | Cheng ................ H04W 72/21 |
| 2020/0229151 A1 | 7/2020 | Zhang |
| 2020/0296726 A1 | 9/2020 | Wu |
| 2020/0314745 A1* | 10/2020 | Yi .................... H04W 72/23 |
| 2021/0029708 A1* | 1/2021 | Khoshnevisan ...... H04L 5/0023 |
| 2021/0058209 A1* | 2/2021 | Qin .................... H04L 5/0023 |
| 2021/0235386 A1* | 7/2021 | Zhang ................ H04W 52/42 |
| 2021/0259004 A1* | 8/2021 | Takeda ................. H04L 1/08 |
| 2021/0345306 A1* | 8/2021 | Takeda ............... H04B 7/0408 |
| 2021/0385041 A1* | 12/2021 | Yang ................. H04B 7/0691 |
| 2022/0094510 A1* | 3/2022 | Zhang ................ H04L 5/0023 |
| 2022/0264323 A1* | 8/2022 | Yang ................. H04L 5/0051 |
| 2022/0278776 A1* | 9/2022 | Ling ................... H04L 1/1861 |
| 2022/0385401 A1* | 12/2022 | Jiang .................. H04L 1/08 |
| 2023/0046074 A1* | 2/2023 | Zhang ................ H04B 7/06964 |
| 2023/0053430 A1* | 2/2023 | Määttänen ........... H04B 7/0404 |
| 2023/0337142 A1* | 10/2023 | Go ...................... H04W 52/242 |

FOREIGN PATENT DOCUMENTS

| | | |
|---|---|---|
| WO | 2020024783 A1 | 2/2020 |
| WO | 2021012163 A1 | 1/2021 |
| WO | 2021016540 A1 | 1/2021 |

OTHER PUBLICATIONS

LG Electronics, "Feature lead summary#3 of Enhancements on Multi-beam Operations, Agenda item: 7.2.8.3", 3GPP TSG RAN WG1 Meeting #97, R1-1907860, Reno, USA, May 13-17, 2019, Total pp. 35 (Year: 2019).*
ISR received in application No. PCT/CN2021/077545 dated May 26, 2021.
CN202010116820.2 Notification to Grant Patent Right for Invention dated Jul. 6, 2022.
CN202010116820.2 First Office Action dated Feb. 16, 2022.
CN202010116820.2 First Search Report dated Feb. 10, 2022.
NTTDOCOMO,INC.Discussiononmulti-beamenhancement 3GPPTSGRANWG1#97,R1-1906225 May 13, 2019.
CAICT "DiscussiononURLLCreliability/robustnes- senhancementwithmulti-TRP/panel" 3GPPTSGRANWG1#96, R1-1902926 Feb. 15, 2019.

* cited by examiner

When first radio resource block comprises K resource sub-blocks

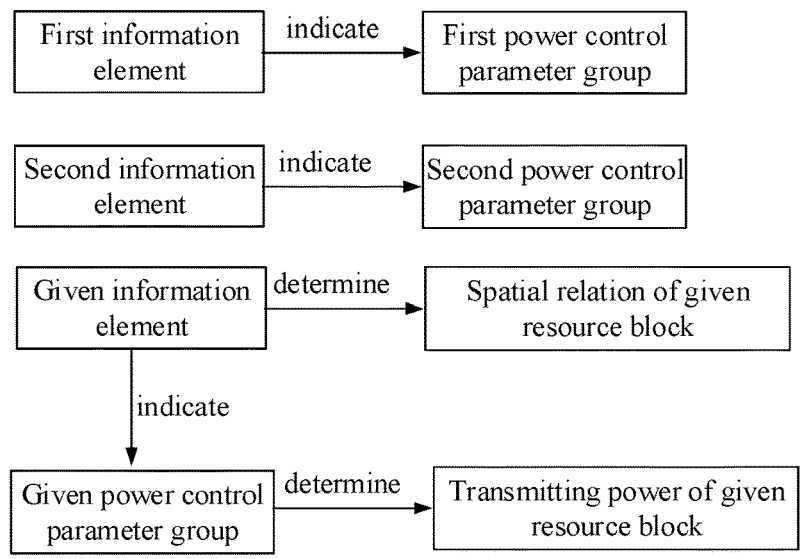

When given information element is first information element, given power control parameter group is first power control parameter group;

When given information element is second information element, given power control parameter group is second power control parameter group;

When first radio resource block only comprises one resource sub-block, given resource block is a first radio resource block;

When first radio resource block comprises K resource sub-blocks, given resource block is any one of the K resource sub-blocks.

FIG. 9

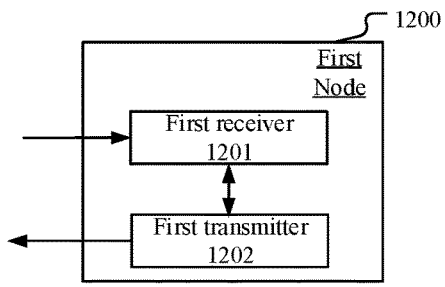

FIG. 10

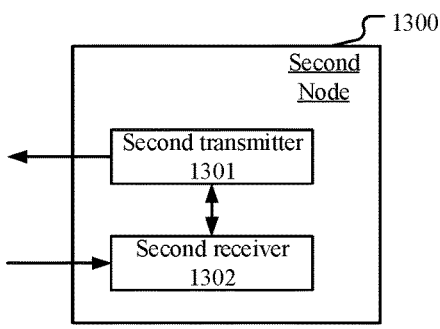

FIG. 11

METHOD AND DEVICE IN A NODE USED FOR WIRELESS COMMUNICATION

CROSS REFERENCE TO RELATED APPLICATIONS

This application is a continuation of International Application No. PCT/CN2021/077545, filed Feb. 24, 2021, claims the priority benefit of Chinese Patent Application No. 202010116820.2, filed on Feb. 25, 2020, the full disclosure of which is incorporated herein by reference.

BACKGROUND

The present disclosure relates to transmission methods and devices in wireless communication systems, and in particular to a method and device of radio signal transmission in a wireless communication system that support cellular networks.

RELATED ART

Downlink transmissions of multiple Transmit-Receive Points (TRPs) and/or multiple antenna panels have already been supported by NR Rel-16 standards, including supporting a piece of DCI for scheduling downlink transmissions of multiple TRPs and/or antenna panels and multiple pieces of DCI for scheduling downlink transmissions of multiple TRPs and/or antenna panels respectively.

A Work Item (WI) of Multiple Input and Multiple Output (MIMO) enhancement in NR Release 17 was approved at the 3GPP RAN #86 Plenary. A key point of the WI is to employ multiple TRPs and/or antenna panels to enhance the reliability and robustness of an uplink channel, for instance, a Physical Uplink Control CHannel (PUCCH) or a Physical Uplink Shared CHannel (PUSCH).

SUMMARY

How to enhance the reliability and robustness of an uplink channel with beam sweeping remains a key issue that needs to be addressed.

To address the above problem, the present disclosure provides a solution. In the statement above, the present disclosure only took the uplink for example, but it is also applicable to other scenarios such as downlink and sidelink communications where similar technical effect can be achieved; additionally, the adoption of a unified solution for various scenarios (including but not limited to uplink, downlink and sidelink) contributes to the reduction of hardcore complexity and costs. It should be noted that if no conflict is incurred, embodiments in a Use Equipment (UE) in the present disclosure and the characteristics of the embodiments are also applicable to a base station, and vice versa. The embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:
  receiving a first information block set;
  receiving a first signaling, the first signaling being used for indicating a first radio resource block, the first radio resource block comprising a positive integer number of resource sub-block(s);
  receiving a first signal; and
  transmitting a first bit block in the first radio resource block;
  herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one embodiment, a problem to be solved in the present disclosure is how to enhance the reliability and robustness of an uplink channel with beam sweeping.

In one embodiment, a problem to be solved in the present disclosure is how to determine a transmitting beam when employing beam sweeping for uplink channel transmission.

In one embodiment, the essence of the above method lies in that a first information element and a second information element respectively indicate two active beams, a number of resource sub-block(s) comprised by the first radio resource block is a number of repetitions of transmission, which determines a beam employed for uplink channel transmission. The above method is advantageous in that transmitting beam sweeping of an uplink channel is fulfilled, which improves the reliability and robustness of the uplink channel.

According to one aspect of the present disclosure, the above method is characterized in that when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined.

In one embodiment, the essence of the above method lies in that K resource sub-blocks are respectively used for K repetitions of transmission, and a relative magnitude of the first index and the second index is used together with time sequences of the K repetitions for determining in which one or more of the K repetitions two activated beams are respectively used.

According to one aspect of the present disclosure, the above method is characterized in that the first index is used for indicating the first information element, while the second index is used for indicating the second information element; the first information block set indicates a third index, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1.

In one embodiment, the essence of the above method lies in that the first information element and the second information element are activated for a first radio resource block set.

In one embodiment, the essence of the above method lies in that the first information element and the second information element are activated by a same MAC CE for a same PUCCH group.

According to one aspect of the present disclosure, the above method is characterized in that the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

In one embodiment, the essence of the above method lies in that the first information element is activated for a second radio resource block set, while the second information element is activated for a third radio resource block set.

In one embodiment, the essence of the above method lies in that the first information element and the second information element are respectively activated by two MAC CEs for different PUCCH groups.

According to one aspect of the present disclosure, the above method is characterized in comprising:
receiving a third information block;
herein, the third information block is used for indicating the M radio resource block sets.

According to one aspect of the present disclosure, the above method is characterized in that the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

According to one aspect of the present disclosure, the above method is characterized in comprising:
receiving a fourth information block;
herein, the fourth information block is used for indicating the N information elements.

The present disclosure provides a method in a second node for wireless communications, comprising:
transmitting a first information block set;
transmitting a first signaling, the first signaling being used for indicating a first radio resource block, the first radio resource block comprising a positive integer number of resource sub-block(s);
transmitting a first signal; and
receiving a first bit block in the first radio resource block;
herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

According to one aspect of the present disclosure, the above method is characterized in that when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined.

According to one aspect of the present disclosure, the above method is characterized in that the first index is used for indicating the first information element, while the second index is used for indicating the second information element; the first information block set indicates a third index, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1.

According to one aspect of the present disclosure, the above method is characterized in that the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

According to one aspect of the present disclosure, the above method is characterized in comprising:
transmitting a third information block;
herein, the third information block is used for indicating the M radio resource block sets.

According to one aspect of the present disclosure, the above method is characterized in that the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

According to one aspect of the present disclosure, the above method is characterized in comprising:
transmitting a fourth information block;
herein, the fourth information block is used for indicating the N information elements.

The present disclosure provides a first node for wireless communications, comprising:
a first receiver, which receives a first information block set; receives a first signaling, the first signaling being used for indicating a first radio resource block, the first radio resource block comprising a positive integer number of resource sub-block(s); and receives a first signal; and
a first transmitter, which transmits a first bit block in the first radio resource block;
herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

The present disclosure provides a second node for wireless communications, comprising:
a second transmitter, which transmits a first information block set; transmits a first signaling, the first signaling being used for indicating a first radio resource block, the first radio resource block comprising a positive integer number of resource sub-block(s); and transmits a first signal; and
a second receiver, which receives a first bit block in the first radio resource block;
herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one embodiment, the method in the present disclosure has the following advantages:

The present disclosure proposes a scheme of how to employ beam sweeping in enhancing the reliability and robustness of an uplink channel.

The present disclosure proposes a scheme of how to determine a transmitting beam when employing beam sweeping for uplink channel transmission.

According to the method provided in the present disclosure, a beam employed for uplink channel transmission can be determined based on a number of repetitions of transmission of the uplink channel, thus realizing transmitting beam sweeping of the uplink channel, and hence an enhancement in the reliability and robustness of the uplink channel.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of a first information element, a second information element and a transmitting power of a given resource block according to one embodiment of the present disclosure.

FIG. 10 illustrates a structure block diagram of a processing device in a first node according to one embodiment of the present disclosure.

FIG. 11 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
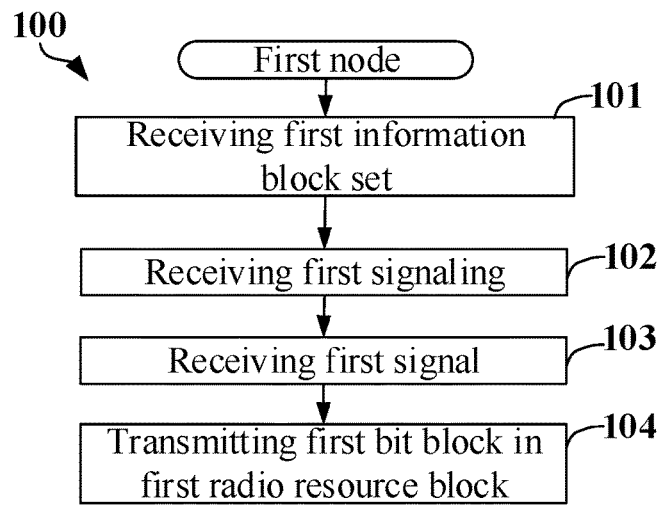
FIG. 1 illustrates a flowchart of a first information block set, a first signaling, a first signal and a first bit block according to one embodiment of the present disclosure.

Embodiment 1 illustrates a flowchart of a first information block set, a first signaling, a first signal and a first bit block according to one embodiment of the present disclosure, as shown in FIG. 1. In FIG. 1, each box represents a step. It should be emphasized that the sequence of each box in FIG. 1 does not represent a chronological order of these steps.

In Embodiment 1, the first node in the present disclosure receives a first information block set in step 101; and receives a first signaling in step 102; receives a first signal in step 103; and transmits a first bit block in a first radio resource block in step 104; herein, the first signaling is used for indicating the first radio resource block, the first radio resource block comprising a positive integer number of resource sub-block(s); the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one embodiment, the first information block set comprises a positive integer number of information block(s).

In one embodiment, the first information block set is carried by MAC CE signaling(s).

In one embodiment, the first information block set is carried by a MAC CE signaling.

In one embodiment, the first information block set comprises a positive integer number of information blocks, and any two information blocks in the first information block set are carried by different MAC CE signalings.

In one embodiment, the first information block set is carried by a physical layer signaling.

In one embodiment, the first information block set comprises a positive integer number of information blocks, and any two information blocks in the first information block set are carried by different physical layer signalings.

In one embodiment, the first signaling is dynamically configured.

In one embodiment, the first signaling is a physical layer signaling.

In one embodiment, the first signaling is Downlink Control Information (DCI).

In one embodiment, the first signaling explicitly indicates a first radio resource block.

In one embodiment, the first signaling implicitly indicates a first radio resource block.

In one embodiment, the first signaling comprises a first field, and the first field in the first signaling is used for indicating a first radio resource block, and the first field in the first signaling comprises a positive integer number of bit(s).

In one subembodiment, the first field in the first signaling indicates an index of a first radio resource block in a target radio resource block set, the target radio resource block set comprising a positive integer number of radio resource block(s).

In one subembodiment, the first field in the first signaling is a PUCCH resource indicator field, and the specific meaning of the PUCCH resource indicator field can be found in 3GPP TS38.212, section 7.3.1.2.

In one embodiment, the first signal comprises data.

In one embodiment, a transmission channel for the first signal is a Downlink Shared Channel (DL-SCH).

In one embodiment, the first signal is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the first signal carries a target bit block set, the target bit block set comprising a positive integer number of bit(s).

In one subembodiment, the target bit block set comprises a positive integer number of Transport Block(s) (TB).

In one subembodiment, the target bit block set comprises one TB.

In one subembodiment, the target bit block set comprises a positive integer number of Code Block Group(s) (CBG).

In one embodiment, the first signaling explicitly indicates scheduling information of the first signal.

In one embodiment, the first signaling implicitly indicates scheduling information of the first signal.

In one embodiment, the scheduling information of the first signal comprises at least one of an occupied time-domain resource, an occupied frequency-domain resource, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), a transmission antenna port or a corresponding Transmission Configuration Indicator (TCI) state.

In one subembodiment, the configuration information of the DMRS comprises at least one of a Reference Signal (RS) sequence, a mapping mode, a DMRS type, an occupied time-domain resource, an occupied frequency-domain resource, an occupied code-domain resource, a cyclic shift or an Orthogonal Cover Code (OCC).

In one embodiment, the first radio resource block comprises a time-domain resource, a frequency-domain resource and a code-domain resource.

In one embodiment, the first radio resource block comprises at least one of a time-domain resource, a frequency-domain resource or a code-domain resource.

In one embodiment, the first radio resource block comprises a time-domain resource and a frequency-domain resource.

In one embodiment, the first radio resource block comprises a code-domain resource.

In one embodiment, any two resource sub-blocks of the K resource sub-blocks are orthogonal in time domain.

In one embodiment, any two resource sub-blocks of the K resource sub-blocks are orthogonal.

In one embodiment, a number of resource sub-block(s) comprised by the first radio resource block is related to a Format of the first radio resource block.

In one embodiment, a number of resource sub-block(s) comprised by the first radio resource block is equal to nrofSlots, and the specific meaning of the nrofSlots can be found in 3GPP TS38.213, section 9.2.6.

In one embodiment, the K is equal to nrofSlots, and the specific meaning of the nrofSlots can be found in 3GPP TS38.213, section 9.2.6.

In one subembodiment, a first format is a format of the first radio resource block, and the first format belongs to a first format set; when configuration information of the first format comprises a second field, the number of resource sub-block(s) comprised by the first radio resource block is equal to the K; when the configuration information of the first format does not comprise a second field, the number of resource sub-block(s) comprised by the first radio resource block is equal to 1.

In one subembodiment, the first format set comprises a positive integer number of format(s).

In one subembodiment, the first format set comprises Format 1, Format 3 or Format 4.

In one subembodiment, the second field indicates a number of repetitions.

In one subembodiment, the second field indicates a number of slots.

In one subembodiment, the second field is a nrofSlots, and the specific meaning of the nrofSlots can be found in 3GPP TS38.213, section 9.2.6.

In one subembodiment, configuration information of the first format comprises PUCCH-FormatConfig.

In one embodiment, a first format is a format of the first radio resource block, and the first format belongs to a second format set; a number of resource sub-block(s) comprised by the first radio resource block is equal to 1.

In one subembodiment, the second format set comprises a Format 2.

In one subembodiment, any format in the second format set does not belong to the first format set.

In one subembodiment, the second format set comprises a positive integer number of format(s).

In one embodiment, the first index is different from the second index.

In one embodiment, the first index and the second index are both non-negative integers.

In one embodiment, the first index and the second index are both positive integers.

In one embodiment, the first index is used for indicating the first information element, while the second index is used for indicating the second information element.

In one embodiment, the first index is used for indicating a second radio resource block set, while the second index is used for indicating a third radio resource block set, and both the second radio resource block set and the second radio resource block set comprise the first radio resource block.

In one embodiment, the first index is used for indicating a second radio resource block set out of M radio resource block sets, while the second index is used for indicating a third radio resource block set out of M radio resource block sets, and both the second radio resource block set and the third radio resource block set comprise the first radio resource block, and any of the M radio resource block sets comprises a positive integer number of radio resource block(s).

In one embodiment, the first bit block comprises a positive integer number of bit(s).

In one embodiment, the first bit block comprises a Hybrid Automatic Repeat reQuest ACKnowledgement (HARQ-ACK) for the first signal.

In one embodiment, the first bit block indicates whether each bit block in the first bit block set carried by the first signal is correctly received.

In one embodiment, a number of resource sub-block(s) comprised by the first radio resource block is equal to a number of repetition(s).

In one embodiment, a number of resource sub-block(s) comprised by the first radio resource block is equal to a number of repetition(s) of a HARQ-ACK for the first signal.

In one embodiment, a number of resource sub-block(s) comprised by the first radio resource block is equal to a number of repetitions of transmission of the first bit block; when the first radio resource block only comprises one resource sub-block, a number of repetition(s) of the first bit block is equal to 1, namely, the first bit block is transmitted only once in the first radio resource block; when the first radio resource block comprises K resource sub-blocks and K is a positive integer greater than 1, the first bit block is transmitted K times in the first radio resource block, namely, the first bit block is transmitted in each of the K resource sub-blocks.

In one embodiment, the first bit block comprises a positive integer number of bit sub-block(s); when the first radio resource block only comprises one resource sub-block, the first bit block only comprises one bit sub-block; when the first radio resource block comprises K resource sub-blocks and K is a positive integer greater than 1, the first bit block comprises K bit sub-blocks, the K bit sub-blocks respectively being transmitted in the K resource sub-blocks, and any of the K bit sub-blocks is used for indicating whether the first signal is correctly received.

In one subembodiment, any bit sub-block in the first bit block comprises a positive integer number of bit(s).

In one subembodiment, the K bit sub-blocks are the same.

In one subembodiment, two bit sub-blocks of the K bit sub-blocks are different.

In one subembodiment, any of the K bit sub-blocks comprises a HARQ-ACK for the first signal.

In one subembodiment, any of the K bit sub-blocks indicates whether each bit block in the first bit block set carried by the first signal is correctly received.

In one embodiment, the first information element is one of the N information elements, and the second information element is one of the N information elements.

In one embodiment, the first information element and the second information element are two active information elements of the N information elements.

In one embodiment, the N information elements respectively comprise N Spatial Settings for a first channel, of which the first information element and the second information element are two active Spatial Settings for the first channel.

In one subembodiment, the first channel is an uplink physical layer control channel.

In one subembodiment, the first channel is a Physical Uplink Control CHannel (PUCCH).

In one subembodiment, the first channel is an uplink physical layer random access channel.

In one subembodiment, the first channel is a Physical Random Access Channel (PRACH).

In one embodiment, the N information elements respectively comprise N Spatial Settings for PUCCH transmission, of which the first information element and the second information element are two active Spatial Settings for PUCCH transmission.

Embodiment 2

Figure 2:
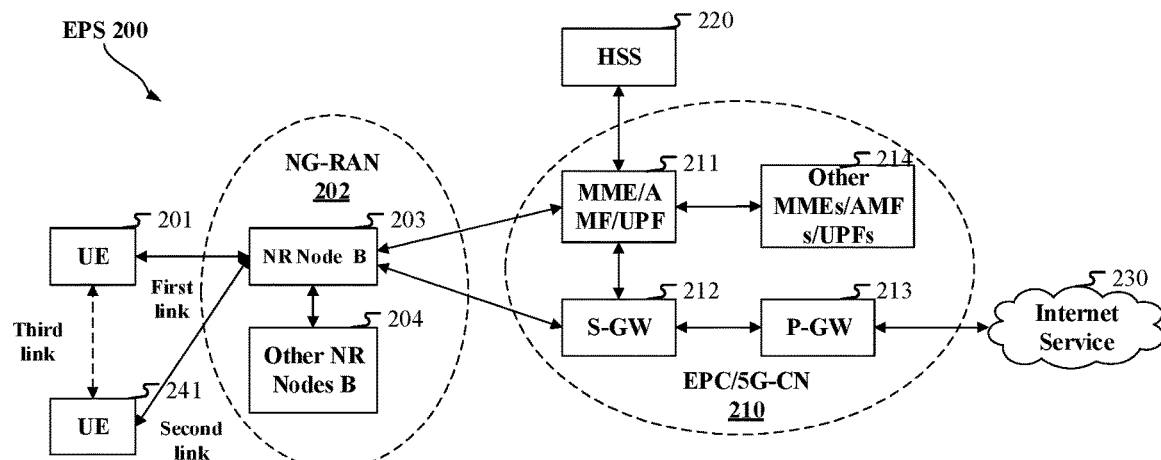
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200, which may comprise one or more UEs 201, a UE 241 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
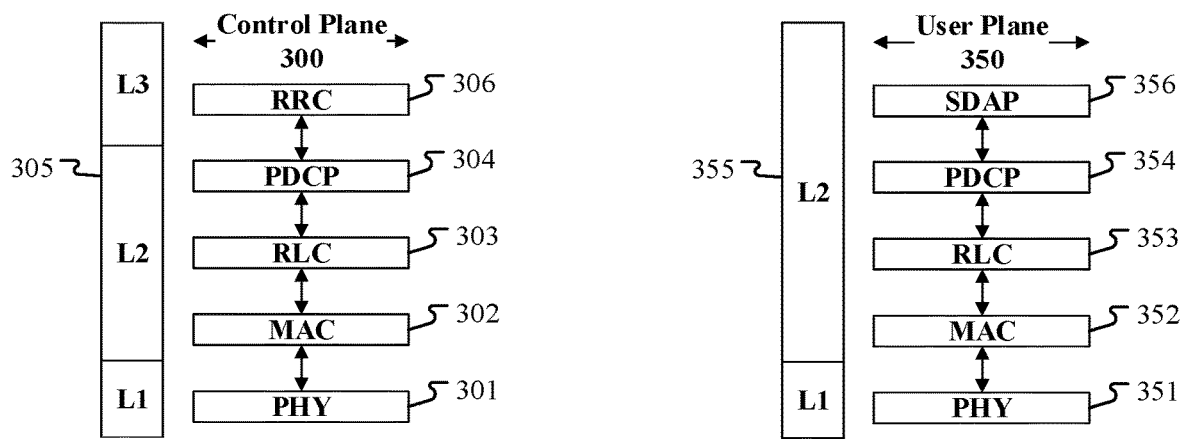
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the third information block in the present disclosure is generated by the RRC sublayer 306.

In one embodiment, the fourth information block in the present disclosure is generated by the RRC sublayer 306.

In one embodiment, the first information block set in the present disclosure is generated by the MAC sublayer 302.

In one embodiment, the first information block set in the present disclosure is generated by the MAC sublayer 352.

In one embodiment, the first information block set in the present disclosure is generated by the PHY 301.

In one embodiment, the first information block set in the present disclosure is generated by the PHY 351.

In one embodiment, the first signaling in the present disclosure is generated by the PHY 301.

In one embodiment, the first signaling in the present disclosure is generated by the PHY 351.

In one embodiment, the first signal in the present disclosure is generated by the PHY 301.

In one embodiment, the first signal in the present disclosure is generated by the PHY 351.

In one embodiment, the first bit block in the present disclosure is generated by the PHY 301.

In one embodiment, the first bit block in the present disclosure is generated by the PHY 351.

Embodiment 4

Figure 4:
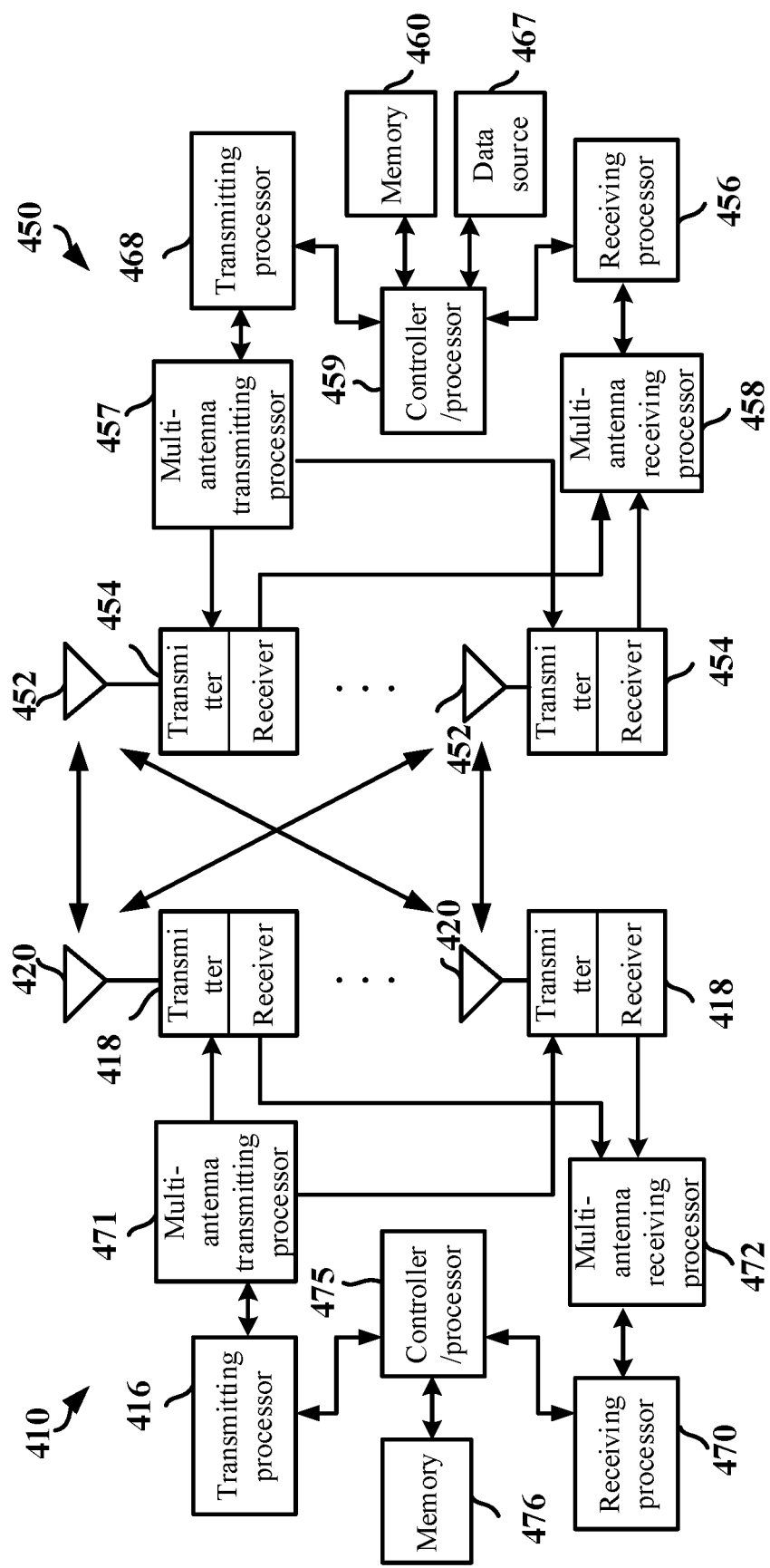
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In DL, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and mapping of signal clusters according to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, and the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure includes the second communication device 450, and the second node in the present disclosure includes the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor is in charge of error detection using ACK and/or NACK protocols as a way to support HARQ operation.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives a first information block set; receives a first signaling, the first signaling being used for indicating a first radio resource block, the first radio resource block comprising a positive integer number of resource sub-block(s); receives a first signal; and transmits a first bit block in the first radio resource block; herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one subembodiment, the second communication device 450 corresponds to the first node in the present disclosure.

In one embodiment, the second communication device 450 comprises a memory that stores computer readable instruction program, the computer readable instruction program generates actions when executed by at least one processor, which include: receiving a first information block set; receiving a first signaling, the first signaling being used for indicating a first radio resource block, the first radio resource block comprising a positive integer number of resource sub-block(s); receiving a first signal; and transmitting a first bit block in the first radio resource block; herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one subembodiment, the second communication device 450 corresponds to the first node in the present disclosure.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits a first information block set; transmits a first signaling, the first signaling being used for indicating a first radio resource block, the first radio resource block comprising a positive integer number of resource sub-block(s); transmits a first signal; and receives a first bit block in the first radio resource block; herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one subembodiment, the first communication device 410 corresponds to the second node in the present disclosure.

In one embodiment, the first communication device 410 comprises a memory that stores computer readable instruction program, the computer readable instruction program generates actions when executed by at least one processor, which include: transmitting a first information block set; transmitting a first signaling, the first signaling being used for indicating a first radio resource block, the first radio resource block comprising a positive integer number of resource sub-block(s); transmitting a first signal; and receiving a first bit block in the first radio resource block; herein, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460 or the data source 467 is used for receiving the third information block in the present disclosure.

In one embodiment, at least one of the antenna 420, the transmitter 418, the multi-antenna transmitting processor 471, the transmitting processor 416, the controller/processor 475 or the memory 476 is used for transmitting the third information block in the present disclosure.

In one embodiment, at least one of the antenna 452, the receiver 454, the multi-antenna receiving processor 458, the receiving processor 456, the controller/processor 459, the memory 460 or the data source 467 is used for receiving the fourth information block in the present disclosure.

In one embodiment, at least one of the antenna 420, the transmitter 418, the multi-antenna transmitting processor 471, the transmitting processor 416, the controller/processor 475 or the memory 476 is used for transmitting the fourth information block in the present disclosure.

In one embodiment, at least one of the antenna 452, the receiver 454, the multi-antenna receiving processor 458, the receiving processor 456, the controller/processor 459, the memory 460 or the data source 467 is used for receiving the first information block set in the present disclosure.

In one embodiment, at least one of the antenna 420, the transmitter 418, the multi-antenna transmitting processor 471, the transmitting processor 416, the controller/processor 475 or the memory 476 is used for transmitting the first information block set in the present disclosure.

In one embodiment, at least one of the antenna 452, the receiver 454, the multi-antenna receiving processor 458, the receiving processor 456, the controller/processor 459, the memory 460 or the data source 467 is used for receiving the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 452, the receiver 454, the multi-antenna receiving processor 458, the receiving processor 456, the controller/processor 459, the memory 460 or the data source 467 is used for receiving the first signal in the present disclosure.

In one embodiment, at least one of the antenna 420, the transmitter 418, the multi-antenna transmitting processor 471, the transmitting processor 416, the controller/processor 475 or the memory 476 is used for transmitting the first signal in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the first bit block of the present disclosure in the first radio resource block of the present disclosure.

In one embodiment, at least one of the antenna 420, the receiver 418, the multi-antenna receiving processor 472, the receiving processor 470, the controller/processor 475 or the memory 476 is used for receiving the first bit block of the present disclosure in the first radio resource block of the present disclosure.

Embodiment 5

Figure 5:
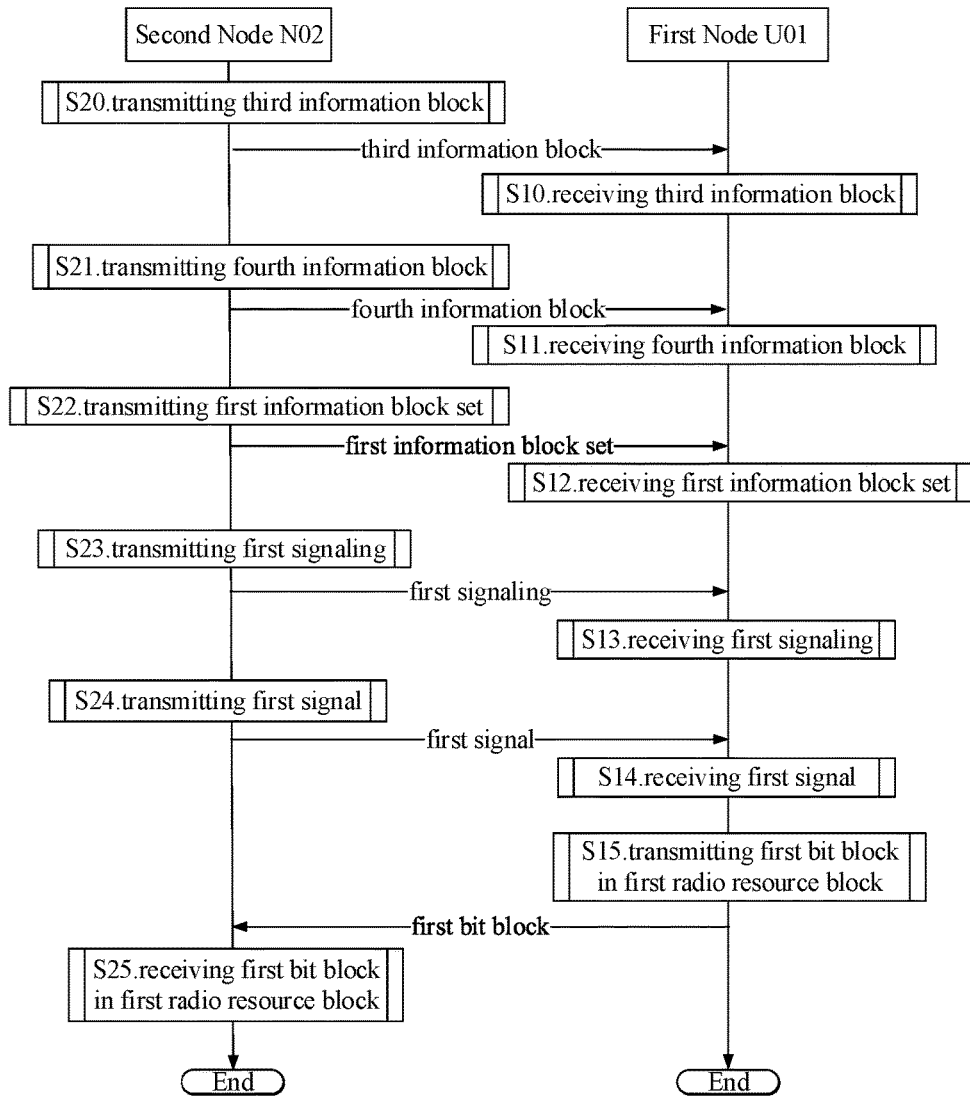
FIG. 5 illustrates a flowchart of radio signal transmission according to one embodiment of the present disclosure.

Embodiment 5 illustrates a flowchart of radio signal transmission according to one embodiment of the present disclosure. In FIG. 5, a first node U01 and a second node N02 are in communication via an air interface.

The first node U01 receives a third information block in step S10; receives a fourth information block in step S11; receives a first information block set in step S12; and receives a first signaling in step S13; receives a first signal in step S14; and transmits a first bit block in a first radio resource block in step S15.

The second node N02 transmits a third information block in step S20; transmits a fourth information block in step S21; transmits a first information block set in step S22; and transmits a first signaling in step S23; transmits a first signal in step S24; and receives a first bit block in a first radio resource block in step 25.

In Embodiment 5, the first signaling is used for indicating the first radio resource block, the first radio resource block comprising a positive integer number of resource sub-block(s); the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used by the first node U01 for determining a spatial relation of the first radio resource block; when the first radio resource block comprises K resource sub-blocks and K is a positive integer greater than 1, the first information element is used by the first node U01 for determining a spatial relation of at least one resource sub-block in the first radio resource block, and the second information element is used by the first node U01 for determining a spatial relation of at least one resource sub-block in the first radio resource block. The third information block is used for indicating the M radio resource block sets. The fourth information block is used for indicating the N information elements.

In one embodiment, a spatial relation of a given resource block is used for transmitting a signal on the given resource block.

In one subembodiment, the given resource block is the first radio resource block.

In one subembodiment, the given resource block is any one of the K resource sub-blocks.

In one embodiment, the spatial relation comprises a Transmission Configuration Indicator (TCI) state.

In one embodiment, the spatial relation comprises a Quasi co-location (QCL) parameter.

In one embodiment, the spatial relation comprises a Spatial domain filter.

In one embodiment, the spatial relation comprises a Spatial domain transmission filter.

In one embodiment, the spatial relation comprises Spatial Tx parameters.

In one embodiment, the Spatial Tx parameters comprise one or more of a transmission antenna port, a transmission antenna port group, a transmitting beam, a transmission analog beamforming matrix, a transmission analog beamforming vector, a transmission beamforming matrix, a transmission beamforming vector or a Spatial domain transmission filter.

In one embodiment, the Spatial Rx parameters comprise one or more of a receiving beam, a reception analog beamforming matrix, a reception analog beamforming vector, a reception beamforming matrix, a reception beamforming vector or a Spatial domain reception filter.

In one embodiment, the give phrase that a given information element is used for determining a spatial relation of a given resource block comprises a meaning that the given information element comprises a given reference signal, and the given reference signal is used for determining a spatial relation of the given resource block.

In one subembodiment, the given reference signal comprises one of a Channel State Information-Reference Signal (CSI-RS), a Sounding Reference Signal (SRS) or a Synchronization Signal/Physical Broadcast CHannel (SS/PBCH) Block.

In one subembodiment, the given reference signal comprises one of a CSI-RS or an SS/PBCH block.

In one subembodiment, when the first radio resource block comprises only one resource sub-block, the given information element is only one of the first information element and the second information element, and the given resource block is the first radio resource block.

In one subembodiment, when the first radio resource block comprises the K resource sub-blocks, the given resource block is any one of the K resource sub-blocks, and the given information element is either the first information element or the second information element.

In one subembodiment, a TCI state of the given reference signal is used for determining a spatial relation of the given resource block.

In one subembodiment, the spatial relation comprises a TCI state, and the TCI state of the given reference signal is the same as that of the given resource block.

In one subembodiment, a QCL parameter of the given reference signal is used for determining a spatial relation of the given resource block.

In one subembodiment, the spatial relation comprises a QCL parameter, and the QCL parameter of the given reference signal is the same as that of the given resource block.

In one subembodiment, a spatial domain filter of the given resource signal is used for determining a spatial relation of the given resource block.

In one subembodiment, the spatial relation comprises a spatial domain filter, and the spatial domain filter of the given reference signal is the same as that of the given resource block.

In one subembodiment, the spatial relation comprises a spatial domain transmission filter, the given reference signal is an uplink signal, and a spatial domain transmission filter of the given reference signal is the same as that of the given resource block.

In one subembodiment, the spatial relation comprises a spatial domain transmission filter, the given reference signal is a downlink signal, and a spatial domain reception filter of the given reference signal is the same as a spatial domain transmission filter of the given resource block.

In one subembodiment, a spatial parameter of the given reference signal is used for determining a spatial relation of the given resource block.

In one subembodiment, the spatial relation comprises a spatial Tx parameter, and the spatial parameter of the given reference signal is the same as the spatial Tx parameter of the given resource block.

In one subembodiment, the spatial relation comprises a spatial Tx parameter, and the given reference signal is an uplink signal, and a Tx transmission parameter of the given reference signal is the same as that of the given resource block.

In one subembodiment, the spatial relation comprises a spatial Tx parameter, and the given reference signal is a downlink signal, and a Tx reception parameter of the given reference signal is the same as a Tx transmission parameter of the given resource block.

In one embodiment, the give phrase that a given information element is used for determining a spatial relation of a given resource block comprises a meaning that the given information element comprises a TCI state, and the TCI state comprised in the given information element is used for determining a spatial relation of the given resource block.

In one subembodiment, the given reference signal comprises one of a CSI-RS, an SRS or an SS/PBCH Block.

In one subembodiment, the given reference signal comprises one of a CSI-RS or an SS/PBCH Block.

In one subembodiment, when the first radio resource block comprises only one resource sub-block, the given information element is only one of the first information element and the second information element, and the given resource block is the first radio resource block.

In one subembodiment, when the first radio resource block comprises the K resource sub-blocks, the given resource block is any one of the K resource sub-blocks, and the given information element is either the first information element or the second information element.

In one subembodiment, a QCL parameter corresponding to the TCI state is used for determining a spatial relation of the given resource block.

In one subembodiment, the spatial relation comprises a QCL parameter, and a QCL parameter corresponding to the TCI state is the same as that of the given resource block.

In one subembodiment, the TCI state comprises a given reference signal, and a spatial domain filter of the given reference signal is used for determining a spatial relation of the given resource block.

In one subembodiment, the spatial relation comprises a spatial domain filter, the TCI state comprises a given reference signal, and a spatial domain filter of the given reference signal is the same as that of the given resource block.

In one subembodiment, the spatial relation comprises a spatial domain transmission filter, the TCI state comprises a given reference signal, and the given reference signal is an uplink signal, and a spatial domain transmission filter of the given reference signal is the same as that of the given resource block.

In one subembodiment, the spatial relation comprises a spatial domain transmission filter, the TCI state comprises a given reference signal, and the given reference signal is a downlink signal, and a spatial domain reception filter of the given reference signal is the same as a spatial domain transmission filter of the given resource block.

In one subembodiment, the TCI state comprises a given reference signal, and a spatial parameter of the given reference signal is used for determining a spatial relation of the given resource block.

In one subembodiment, the spatial relation comprises a spatial Tx parameter, the TCI state comprises a given reference signal, and the spatial parameter of the given reference signal is the same as the spatial Tx parameter of the given resource block.

In one subembodiment, the spatial relation comprises a spatial Tx parameter, the TCI state comprises a given reference signal, and the given reference signal is an uplink signal, and the spatial Tx parameter of the given reference signal is the same as that of the given resource block.

In one subembodiment, the spatial relation comprises a spatial Tx parameter, the TCI state comprises a given reference signal, and the given reference signal is a downlink signal, and the spatial Rx parameter of the given reference signal is the same as the spatial Tx parameter of the given resource block.

In one embodiment, the N information elements respectively comprise N reference signals, and any of the N reference signals is used for determining a spatial relation.

In one subembodiment, a given information element is used for determining a spatial relation of a given resource block, a given reference signal is one of the N reference signals that is comprised by the given information element, and the spatial relation of the given resource block is the same as a spatial relation determined by the given reference signal; when the first radio resource block comprises only one resource sub-block, the given information element is only one of the first information element and the second information element, and the given resource block is the first radio resource block; when the first radio resource block comprises the K resource sub-blocks, the given resource block is any one of the K resource sub-blocks, and the given information element is either the first information element or the second information element.

In one subembodiment, any of the N reference signals comprises one of a Channel State Information-Reference Signal (CSI-RS), a Sounding Reference Signal (SRS) or a Synchronization Signal/Physical Broadcast CHannel (SS/PBCH) Block.

In one subembodiment, the N reference signals comprise one or more of (a) CSI-RS(s), (an) SRS(s) or (an) SS/PBCH Block(s).

In one subembodiment, the N reference signals comprise one or more of (a) CSI-RS(s) or (an) SS/PBCH Block(s).

In one embodiment, the N information elements respectively comprise N Transmission Configuration Indicator (TCI) States, and any of the N TCI states is used for determining a spatial relation.

In one subembodiment, the N TCI states respectively comprise N reference signals, and any of the N reference signals is used for determining a spatial relation; any of the N reference signals comprises one of a CSI-RS, an SRS or an SS/PBCH Block.

In one subembodiment, the N TCI states respectively comprise N reference signals, and any of the N reference signals is used for determining a spatial relation; the N reference signals comprise one or more of (a) CSI-RS(s), (an) SRS(s) or (an) SS/PBCH Block(s).

In one embodiment, when the first radio resource block comprises only one resource sub-block, one of the first information element and the second information element that is last received is used for determining the spatial relation of the first radio resource block.

In one embodiment, when the first radio resource block comprises only one resource sub-block, a relative magnitude of the first index and the second index is used for determining which one of the first information element and the second information element is used to determine a spatial relation of the first radio resource block.

In one subembodiment, a second reference information element is one of the first information element and the second information element that corresponds to a smaller value between the first index and the second index, and the spatial relation of the first radio resource block is determined by the second reference information element.

In one subembodiment, a second reference information element is one of the first information element and the second information element that corresponds to a greater value between the first index and the second index, and the spatial relation of the first radio resource block is determined by the second reference information element.

In one subembodiment, the first index is less than the second index, and the spatial relation of the first radio resource block is determined by the first information element.

In one subembodiment, the second index is less than the first index, and the spatial relation of the first radio resource block is determined by the second information element.

In one subembodiment, the first index is greater than the second index, and the spatial relation of the first radio resource block is determined by the first information element.

In one subembodiment, the second index is greater than the first index, and the spatial relation of the first radio resource block is determined by the second information element.

In one embodiment, any one of the M radio resource block sets comprises a time-domain resource, a frequency-domain resource and a code-domain resource.

In one embodiment, any one of the M radio resource block sets comprises at least one of a time-domain resource, a frequency-domain resource or a code-domain resource.

In one embodiment, any one of the M radio resource block sets comprises a time-domain resource and a frequency-domain resource.

In one embodiment, any one of the M radio resource block sets comprises a code-domain resource.

In one embodiment, the third information block is semi-statically configured.

In one embodiment, the third information block is carried by a higher-layer signaling.

In one embodiment, the third information block is carried by an RRC signaling.

In one embodiment, the third information block comprises an IE in an RRC signaling.

In one embodiment, the third information block comprises multiple IEs in an RRC signaling.

In one embodiment, the third information block explicitly indicates the M radio resource block sets.

In one embodiment, the third information block implicitly indicates the M radio resource block sets.

In one embodiment, a given radio resource block is any radio resource block in the M radio resource block sets, and the third information block indicates a radio resource block set of the M radio resource block sets to which the given radio resource block belongs.

In one embodiment, the third information block indicates radio resource blocks respectively comprised by the M radio resource block sets.

In one embodiment, the fourth information block is semi-statically configured.

In one embodiment, the fourth information block is carried by a higher-layer signaling.

In one embodiment, the fourth information block is carried by an RRC signaling.

In one embodiment, the fourth information block comprises an IE in an RRC signaling.

In one embodiment, the fourth information block comprises multiple IEs in an RRC signaling.

In one embodiment, the fourth information block is a PUCCH-SpatialRelationInfo IE, and the specific meaning of the PUCCH-SpatialRelationInfo IE can be found in 3GPP TS38.331, section 6.3.2.

In one embodiment, the fourth information block explicitly indicates the N information elements.

In one embodiment, the fourth information block implicitly indicates the N information elements.

Embodiment 6

Figure 6:
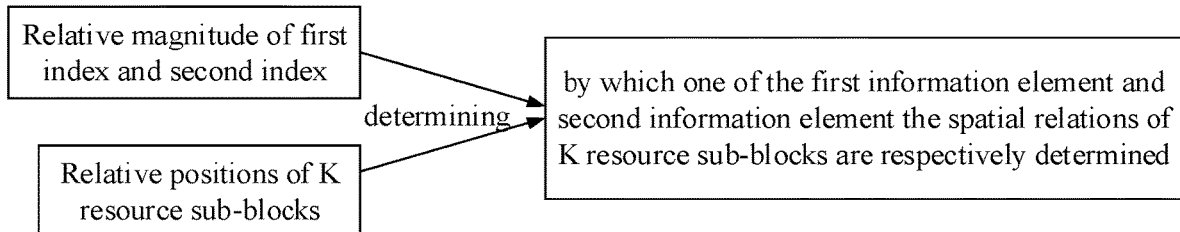
FIG. 6 illustrates a schematic diagram of spatial relations of K resource sub-blocks according to one embodiment of the present disclosure.

Embodiment 6 illustrates a schematic diagram of spatial relations of K resource sub-blocks, as shown in FIG. 6.

In Embodiment 6, when the first radio resource block in the present disclosure comprises the K resource sub-blocks, a magnitude of the first index and the second index in the present disclosure and relative positions of the K resource sub-blocks are together used for determining by which one of the first information element and the second information element the spatial relations of the K resource sub-blocks are determined.

In one embodiment, a first resource sub-block is an earliest resource sub-block in the K resource sub-blocks, and a relative magnitude of the first index and the second index is used for determining by which one of the first information element and the second information element the spatial relation of the first resource sub-block is determined.

In one subembodiment, a first reference information element is one of the first information element and the second information element that corresponds to a smaller value between the first index and the second index, and the spatial relation of the first resource sub-block is determined by the first reference information element.

In one subembodiment, a first reference information element is one of the first information element and the second information element that corresponds to a greater value between the first index and the second index, and the spatial relation of the first resource sub-block is determined by the first reference information element.

In one subembodiment, the first index is less than the second index, and the spatial relation of the first resource sub-block is determined by the first information element.

In one subembodiment, the second index is less than the first index, and the spatial relation of the first resource sub-block is determined by the second information element.

In one subembodiment, the first index is greater than the second index, and the spatial relation of the first resource sub-block is determined by the first information element.

In one subembodiment, the second index is greater than the first index, and the spatial relation of the first resource sub-block is determined by the second information element.

In one embodiment, relative positions of the K resource sub-blocks are respectively K consecutive non-negative integers.

In one embodiment, relative positions of the K resource sub-blocks are respectively K consecutive positive integers.

In one embodiment, relative positions of the K resource sub-blocks are respectively orderings of the K resource sub-blocks.

In one embodiment, relative positions of the K resource sub-blocks are respectively chronological orderings of the K resource sub-blocks.

In one embodiment, relative positions of the K resource sub-blocks are respectively 0, 1, . . . and K−1; according to a chronological order of receiving, a given resource sub-block is a (k+1)-th resource sub-block of the K resource sub-blocks, and a position of the given resource sub-block relative to the K resource sub-blocks is k, herein k=0, 1, . . . , K−1.

In one embodiment, relative positions of the K resource sub-blocks are respectively 1, 2, . . . and K; according to a chronological order of receiving, a given resource sub-block is a k-th resource sub-block of the K resource sub-blocks, and a position of the given resource sub-block relative to the K resource sub-blocks is k, herein k=1, 2, . . . , K.

In one embodiment, a first resource sub-block is an earliest resource sub-block in the K resource sub-blocks, while a given resource sub-block is any of the K resource sub-blocks other than the first resource sub-block, and a relative position of the given resource sub-block in the K resource sub-blocks is used for determining whether a spatial relation of the given resource sub-block and the spatial relation of the first resource sub-block are determined by a same information element of the first information element and the second information element.

In one embodiment, a first position set comprises relative positions of the K resource sub-blocks, and the first position set comprises a first subset and a second subset, the first subset being orthogonal with the second subset; a first resource sub-block is an earliest resource sub-block in the K resource sub-blocks, while a given resource sub-block is any of the K resource sub-blocks other than the first resource sub-block;
  when a relative position of the given resource sub-block in the K resource sub-blocks belongs to the first subset, the spatial relation of the given resource sub-block and the spatial relation of the first resource sub-block are determined by a same information element of the first information element and the second information element; when a relative position of the given resource sub-block in the K resource sub-blocks belongs to the second subset, the spatial relation of the given resource sub-block and the spatial relation of the first resource sub-block are separately determined by different information elements of the first information element and the second information element.

In one subembodiment, any integer in the first position set belongs to only one of the first subset and the second subset; the first subset comprises at least one integer in the first position set, and the second subset comprises at least one integer in the first position set.

In one subembodiment, not any integer in the first position set belongs to the second subset.

Embodiment 7

Figure 7:
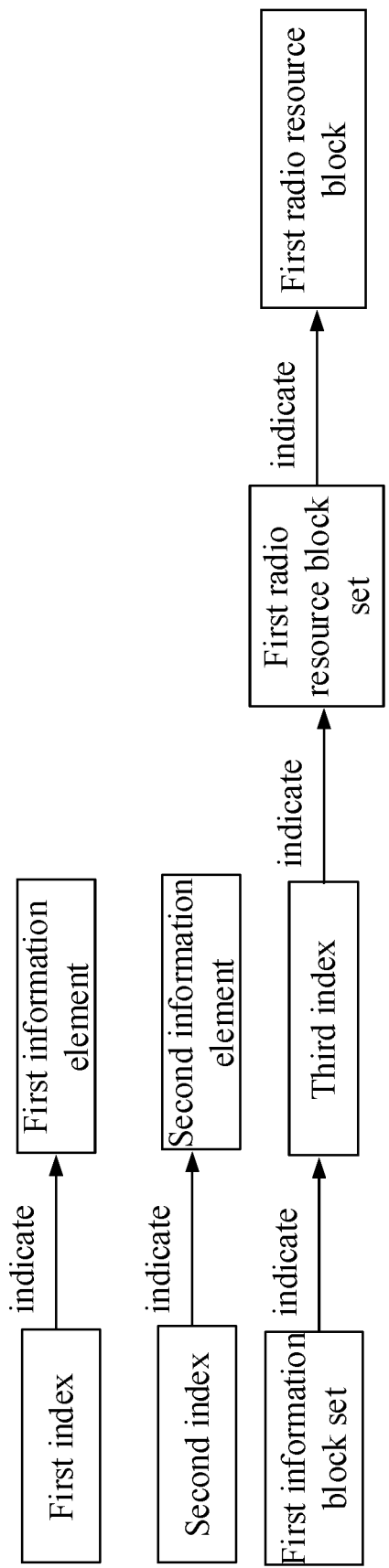
FIG. 7 illustrates a schematic diagram of a first index, a second index and a first information block set according to one embodiment of the present disclosure.

Embodiment 7 illustrates a schematic diagram of a first index, a second index and a first information block set, as shown in FIG. 7.

In Embodiment 7, the first index is used for indicating the first information element in the present disclosure, while the second index is used for indicating the second information element in the present disclosure; the first information block set indicates a third index, and the third index is used for indicating a first radio resource block set out of M radio resource block sets, the first radio resource block set comprising the first radio resource block in the present disclosure, and any radio resource block set of the M radio resource block sets comprises a positive integer number of radio resource block(s), M being a positive integer greater than 1.

In one embodiment, the first information block set is carried by a MAC CE signaling, and the MAC CE signaling carrying the first information block set is identified by a MAC subheader of which a Logical Channel Identity (LCID) value is equal to 49.

In one embodiment, the first information block set is carried by a PUCCH spatial relation Activation/Deactivation MAC CE signaling.

In one embodiment, the first information block set comprises a third field, and the third field comprises N bits, the N bits respectively indicating whether the N information elements are activated; the third field of the first information block set indicates that the first information element and the second information element are activated.

In one subembodiment, a given bit is any one of the N bits, and the given bit indicates whether a given information element of the N information elements is activated; when a value of the given bit is 1, the given information element is activated; when a value of the given bit is 0, the given information element is deactivated.

In one subembodiment, a bit of the N bits corresponding to the first information element indicates that the first information element is activated, and a bit of the N bits corresponding to the second information element indicates that the second information element is activated.

In one embodiment, the phrase that the first information element corresponds to a first index means that the first index is used for indicating the first information element; the phrase that the second information element corresponds to a second index means that the second index is used for indicating the second information element.

In one embodiment, the first information element and the second information element are used for determining a spatial relation of the first radio resource block set.

In one embodiment, the first index explicitly indicates the first information element.

In one embodiment, the first index implicitly indicates the first information element.

In one embodiment, the second index explicitly indicates the second information element.

In one embodiment, the second index implicitly indicates the second information element.

In one embodiment, the first index is an index of the first information element, while the second index is an index of the second information element.

In one embodiment, the first index is an index of the first information element in the N information elements, while the second index is an index of the second information element in the N information elements.

In one embodiment, the first index and the second index are PUCCH-SpatialRelationInfolds.

In one embodiment, the third index is a positive integer.

In one embodiment, the third index is a non-negative integer.

In one embodiment, the third index is a positive integer no greater than the N.

In one embodiment, the third index is a non-negative integer less than the N.

In one embodiment, the first information block set comprises a fourth field, the fourth field comprising a positive integer number of bit(s), and the fourth field of the first information block set indicates the third index.

In one embodiment, the third index is an index of the first radio resource block set in the M radio resource block sets.

In one embodiment, the third index is an index of the first radio resource block set.

In one embodiment, the first radio resource block is a radio resource block in the first radio resource block set.

In one embodiment, any radio resource block in the M radio resource block sets comprises a time-domain resource, a frequency-domain resource and a code-domain resource.

In one embodiment, any radio resource block in the M radio resource block sets comprises at least one of a time-domain resource, a frequency-domain resource or a code-domain resource.

In one embodiment, any radio resource block in the M radio resource block sets comprises a time-domain resource and a frequency-domain resource.

In one embodiment, any radio resource block in the M radio resource block sets comprises a code-domain resource.

Embodiment 8

Figure 8:
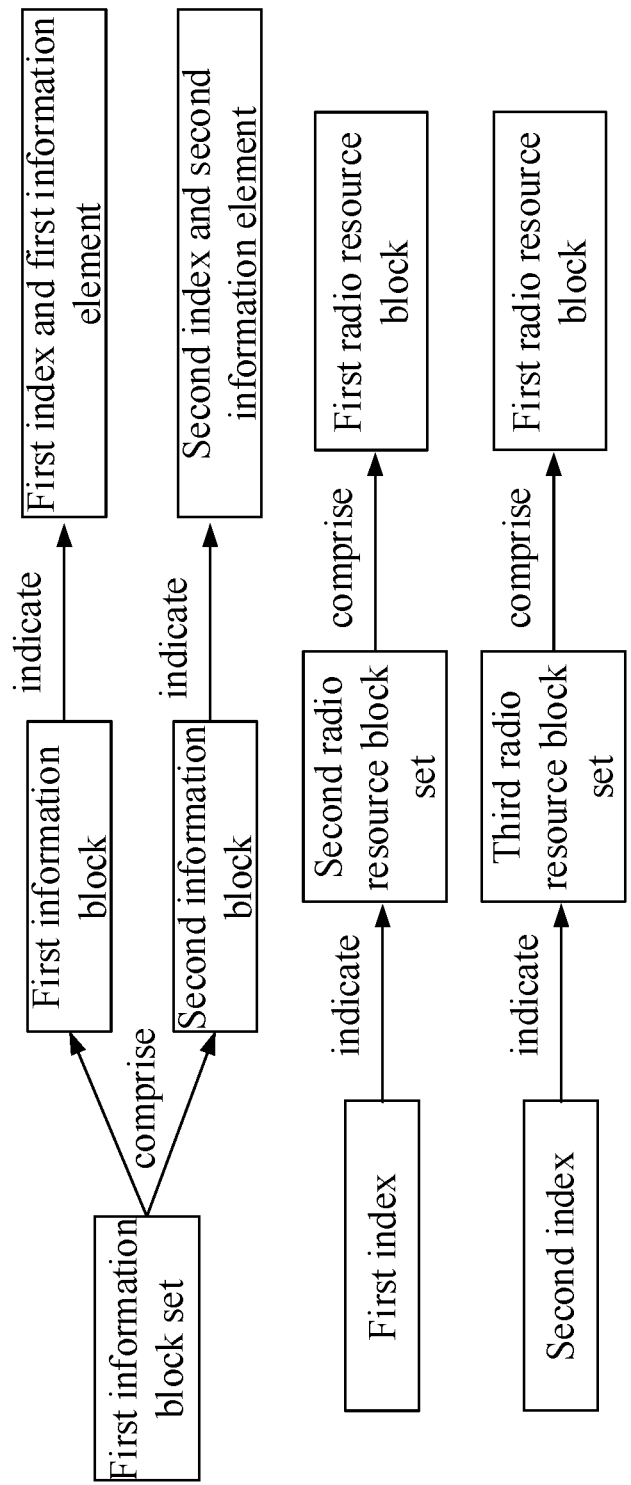
FIG. 8 illustrates a schematic diagram of a first index, a second index and a first information block set according to another embodiment of the present disclosure.

Embodiment 8 illustrates another schematic diagram of a first index, a second index and a first information block set, as shown in FIG. 8.

In Embodiment 8, the first information block set comprises a first information block and a second information block, of which the first information block indicates the first index and the first information element in the present disclosure, while the second information block indicates the second index and the second information element in the present disclosure; the first index is used for indicating a second radio resource block set out of M radio resource block sets, while the second index is used for indicating a third radio resource block set out of the M radio resource block sets, and both the second radio resource block set and the third radio resource block set comprise the first radio resource block in the present disclosure, and any of the M radio resource block sets comprises a positive integer number of radio resource block(s), M being a positive integer greater than 1.

In one embodiment, the first information block and the second information block are respectively carried by two first-type signalings.

In one embodiment, a first-type signaling is a MAC CE signaling, and the first-type signaling is identified by a MAC subheader of which a LCID value is equal to 49.

In one embodiment, a first-type signaling is a physical layer signaling.

In one embodiment, the first information block and the second information block are respectively carried by two MAC CE signalings, and the two MAC CE signalings are both identified by a MAC subheader of which a LCID value is equal to 49.

In one embodiment, the first information block and the second information block are respectively carried by two PUCCH spatial relation Activation/Deactivation MAC CE signalings.

In one embodiment, the first information block set comprises a first information block and a second information block, of which both the first information block and the second information block comprise a third field, the third field comprising N bits, the N bits respectively indicating whether the N information elements are activated; the third field of the first information block indicates that the first information element is activated, while the third field of the second information block indicates that the second information element is activated.

In one subembodiment, the first information block and the second information block are two first-type information blocks respectively, each first-type information block comprising the third field.

In one subembodiment, a given bit is any one of the N bits, and the given bit indicates whether a given information element of the N information elements is activated; when a value of the given bit is 1, the given information element is activated; when a value of the given bit is 0, the given information element is deactivated.

In one subembodiment, a bit corresponding to the first information element in the N bits comprised by the first information block indicates that the first information element is activated, and a bit corresponding to the second information element in the N bits comprised by the second information block indicates that the second information element is activated.

In one embodiment, the phrase that the first information element corresponds to a first index means that the first information block indicates the first index and the first information element, of which the first index is used for indicating a second radio resource block set out of M radio resource block sets; the phrase that the second information element corresponds to a second index means that the second information block indicates the second index and the second information element, of which the second index is used for indicating a third radio resource block set out of the M radio resource block sets.

In one embodiment, the phrase that the first information element corresponds to a first index means that the first index is used for indicating a second radio resource block set out of M radio resource block sets, and the first information element is used for determining a spatial relation of the second radio resource block set; the phrase that the second information element corresponds to a second index means that the second index is used for indicating a third radio resource block set out of the M radio resource block sets, and the second information element is used for determining a spatial relation of the third radio resource block set.

In one embodiment, the first index is an index of the second radio resource block set in the M radio resource block sets, while the second index is an index of the third radio resource block set in the M radio resource block sets.

In one embodiment, the first index is an index of the second radio resource block set, while the second index is an index of the third radio resource block set.

In one embodiment, the first information element is used for determining a spatial relation of the second radio resource block set, while the second information element is used for determining a spatial relation of the third radio resource block set.

In one embodiment, the first information block set comprises a first information block and a second information block, of which both the first information block and the second information block comprise a fourth field, the fourth field comprising a positive integer number of bit(s), the fourth field of the first information block indicates the first index, while the fourth field of the second information block indicates the second index.

In one embodiment, the first radio resource block is a radio resource block in the second radio resource block set, and the first radio resource block is a radio resource block in the third radio resource block set.

Embodiment 9

Embodiment 9 illustrates a schematic diagram of a first information element, a second information element and a transmitting power of a given resource block, as shown in FIG. 9.

In Embodiment 9, the first information element indicates a first power control parameter group, while the second information element indicates a second power control parameter group; a given information element is one of the first information element and the second information element used for determining a spatial relation of a given resource block, and a power control parameter group of the first power control parameter group and the second power control parameter group indicated by the given information element is used for determining a transmitting power of the given resource block; when the first radio resource block in the present disclosure comprises only one resource sub-block, the given resource block is the first radio resource block; when the first radio resource block comprises K resource sub-blocks, the given resource block is any resource sub-block of the K resource sub-blocks.

In one embodiment, the transmitting power of the given resource block is measured by dBm.

In one embodiment, the transmitting power of the given resource block is $P_{PUCCH,b,f,c}(i, q_u, q_d, 1)$, and the specific meaning of the $P_{PUCCH,b,f,c}(i, q_u, q_d, 1)$ can be found in 3GPP TS38.213, section 7.2.1.

In one embodiment, a first power control parameter group comprises a positive integer number of parameter(s), and the second power control parameter group comprises a positive integer number of parameter(s).

In one embodiment, the first power control parameter group comprises an index of a Pathloss Reference Signal, an expected power value and an index of power control adjustment state.

In one embodiment, the first power control parameter group comprises an index of a Pathloss Reference Signal.

In one embodiment, the first power control parameter group comprises an index of a Pathloss Reference Signal and an expected power value.

In one embodiment, the first power control parameter group comprises a pucch-PathlossReferenceRS-Id, while the second power control parameter group comprises a pucch-PathlossReferenceRS-Id.

In one embodiment, the first power control parameter group comprises a pucch-PathlossReferenceRS-Id, a p0-PUCCH-Id and a closedLoopIndex, while the second power control parameter group comprises a pucch-PathlossReferenceRS-Id and a p0-PUCCH-Id.

In one embodiment, the first power control parameter group comprises a pucch-PathlossReferenceRS-Id, a p0-PUCCH-Id and a closedLoopIndex, while the second power control parameter group comprises a pucch-PathlossReferenceRS-Id, a p0-PUCCH-Id and a closedLoopIndex.

In one embodiment, the N information elements respectively indicate N power control parameter groups, the first power control parameter group is one of the N power control parameter groups, and the second power control parameter group is one of the N power control parameter groups.

In one subembodiment, any power control parameter group of the N power control parameter groups comprises a positive integer number of parameter(s).

In one subembodiment, any power control parameter group of the N power control parameter groups comprises an index of a Pathloss Reference Signal, an expected power value and an index of power control adjustment state.

In one subembodiment, any power control parameter group of the N power control parameter groups comprises an index of a Pathloss Reference Signal.

In one subembodiment, any power control parameter group of the N power control parameter groups comprises an index of a Pathloss Reference Signal and an expected power value.

In one subembodiment, any power control parameter group of the N power control parameter groups comprises a pucch-PathlossReferenceRS-Id.

In one subembodiment, any power control parameter group of the N power control parameter groups comprises a pucch-PathlossReferenceRS-Id and a p0-PUCCH-Id.

In one subembodiment, any power control parameter group of the N power control parameter groups comprises a pucch-PathlossReferenceRS-Id, a p0-PUCCH-Id and a closedLoopIndex.

In one embodiment, when the first information element is used for determining the spatial relation of the given resource block, the first power control parameter group is used for determining a transmitting power of the given resource block; when the second information element is used for determining the spatial relation of the given resource block, the second power control parameter group is used for determining a transmitting power of the given resource block.

In one embodiment, a first power control parameter group comprises an index of a first Pathloss Reference Signal, while a second power control parameter group comprises an index of a second Pathloss Reference Signal; when the first information element is used for determining the spatial relation of the given resource block, a first pathloss is obtained through measurement on the first Pathloss reference signal, and the transmitting power of the given resource block is linear with the first pathloss; when the second information element is used for determining the spatial relation of the given resource block, a second pathloss is obtained through measurement on the second Pathloss reference signal, and the transmitting power of the given resource block is linear with the second pathloss.

In one subembodiment, the first pathloss is measured by dB, and the second pathloss is measured by dB.

In one subembodiment, the first pathloss is a difference value obtained by subtracting a transmitting power of the first Pathloss reference signal from a receiving power of the first Pathloss reference signal, and the second pathloss is a difference value obtained by subtracting a transmitting power of the second Pathloss reference signal from a receiving power of the second Pathloss reference signal.

In one subembodiment, a linear correlation coefficient between the transmitting power of the given resource block and the first pathloss is equal to 1, and a linear correlation coefficient between the transmitting power of the given resource block and the second pathloss is equal to 1.

In one embodiment, a first power control parameter group comprises a first expected power value, and a second power control parameter group comprises a second expected power value; when the first information element is used for determining the spatial relation of the given resource block, the transmitting power of the given resource block is linear with the first expected power value; when the second information element is used for determining the spatial relation of the given resource block, the transmitting power of the given resource block is linear with the second expected power value.

In one subembodiment, the first expected power value is measured by dBm, and the second expected power value is measured by dBm.

In one subembodiment, a linear correlation coefficient between the transmitting power of the given resource block and the first expected power value is equal to 1, and a linear correlation coefficient between the transmitting power of the given resource block and the second expected power value is equal to 1.

In one subembodiment, the first expected power value and the second expected power value are both $P_{O\_UE\_PUCCH}$, and the specific meaning of the $P_{O\_UE\_PUCCH}$ can be found in 3GPP TS38.213, section 7.2.1.

Embodiment 10

Embodiment 10 illustrates a structure block diagram of a processing device in a first node, as shown in FIG. 10. In FIG. 10, a first node's processing device 1200 comprises a first receiver 1201 and a first transmitter 1202.

In one embodiment, the first node 1200 is a UE.

In one embodiment, the first node 1200 is a relay node.

In one embodiment, the first node 1200 is vehicle-mounted communication equipment.

In one embodiment, the first node 1200 is a UE supporting V2X communications.

In one embodiment, the first node 1200 is a relay node supporting V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 illustrated by FIG. 4 in the present disclosure.

In one embodiment, the first receiver 1201 comprises at least the first five of the antenna 452, the receiver 454, the multi-antenna receiving processor 458, the receiving processor 456, the controller/processor 459, the memory 460 and the data source 467 illustrated by FIG. 4 in the present disclosure.

In one embodiment, the first receiver 1201 comprises at least the first four of the antenna 452, the receiver 454, the multi-antenna receiving processor 458, the receiving processor 456, the controller/processor 459, the memory 460 and the data source 467 illustrated by FIG. 4 in the present disclosure.

In one embodiment, the first receiver 1201 comprises at least the first three of the antenna 452, the receiver 454, the multi-antenna receiving processor 458, the receiving processor 456, the controller/processor 459, the memory 460 and the data source 467 illustrated by FIG. 4 in the present disclosure.

In one embodiment, the first receiver 1201 comprises at least the first two of the antenna 452, the receiver 454, the multi-antenna receiving processor 458, the receiving processor 456, the controller/processor 459, the memory 460 and the data source 467 illustrated by FIG. 4 in the present disclosure.

In one embodiment, the first transmitter 1202 comprises at least one of the antenna 452, the transmitter 454, the multi-antenna transmitting processor 457, the transmitting processor 468, the controller/processor 459, the memory 460 or the data source 467 illustrated by FIG. 4 in the present disclosure.

In one embodiment, the first transmitter 1202 comprises at least the first five of the antenna 452, the transmitter 454, the multi-antenna transmitting processor 457, the transmitting processor 468, the controller/processor 459, the memory 460 and the data source 467 illustrated by FIG. 4 in the present disclosure.

In one embodiment, the first transmitter 1202 comprises at least the first four of the antenna 452, the transmitter 454, the multi-antenna transmitting processor 457, the transmitting processor 468, the controller/processor 459, the memory 460 and the data source 467 illustrated by FIG. 4 in the present disclosure.

In one embodiment, the first transmitter 1202 comprises at least the first three of the antenna 452, the transmitter 454, the multi-antenna transmitting processor 457, the transmitting processor 468, the controller/processor 459, the memory 460 and the data source 467 illustrated by FIG. 4 in the present disclosure.

In one embodiment, the first transmitter 1202 comprises at least the first two of the antenna 452, the transmitter 454, the multi-antenna transmitting processor 457, the transmitting processor 468, the controller/processor 459, the memory 460 and the data source 467 illustrated by FIG. 4 in the present disclosure.

The first receiver 1201 receives a first information block set; receives a first signaling, the first signaling being used for indicating a first radio resource block, the first radio resource block comprising a positive integer number of resource sub-block(s); and receives a first signal.

The first transmitter 1202 transmits a first bit block in the first radio resource block.

In Embodiment 10, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one embodiment, when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined.

In one embodiment, the first index is used for indicating the first information element, while the second index is used for indicating the second information element; the first information block set indicates a third index, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1.

In one embodiment, the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

In one embodiment, the first receiver 1201 also receives a third information block; herein, the third information block is used for indicating the M radio resource block sets.

In one embodiment, the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

In one embodiment, the first receiver 1201 also receives a fourth information block; herein, the fourth information block is used for indicating the N information elements.

Embodiment 11

Embodiment 11 illustrates a structure block diagram of a processing device in a second node, as shown in FIG. 11. In FIG. 11, a second node's processing device 1300 comprises a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 illustrated by FIG. 4 in the present disclosure.

In one embodiment, the second transmitter 1301 comprises at least the first five of the antenna 420, the transmitter 418, the multi-antenna transmitting processor 471, the transmitting processor 416, the controller/processor 475 and the memory 476 illustrated by FIG. 4 in the present disclosure.

In one embodiment, the second transmitter 1301 comprises at least the first four of the antenna 420, the transmitter 418, the multi-antenna transmitting processor 471, the transmitting processor 416, the controller/processor 475 and the memory 476 illustrated by FIG. 4 in the present disclosure.

In one embodiment, the second transmitter 1301 comprises at least the first three of the antenna 420, the transmitter 418, the multi-antenna transmitting processor 471, the transmitting processor 416, the controller/processor 475 and the memory 476 illustrated by FIG. 4 in the present disclosure.

In one embodiment, the second transmitter 1301 comprises at least the first two of the antenna 420, the transmitter 418, the multi-antenna transmitting processor 471, the transmitting processor 416, the controller/processor 475 and the memory 476 illustrated by FIG. 4 in the present disclosure.

In one embodiment, the second receiver 1302 comprises at least one of the antenna 420, the receiver 418, the multi-antenna receiving processor 472, the receiving processor 470, the controller/processor 475 or the memory 476 illustrated by FIG. 4 in the present disclosure.

In one embodiment, the second receiver 1302 comprises at least the first five of the antenna 420, the receiver 418, the multi-antenna receiving processor 472, the receiving processor 470, the controller/processor 475 and the memory 476 illustrated by FIG. 4 in the present disclosure.

In one embodiment, the second receiver 1302 comprises at least the first four of the antenna 420, the receiver 418, the multi-antenna receiving processor 472, the receiving processor 470, the controller/processor 475 and the memory 476 illustrated by FIG. 4 in the present disclosure.

In one embodiment, the second receiver 1302 comprises at least the first three of the antenna 420, the receiver 418, the multi-antenna receiving processor 472, the receiving processor 470, the controller/processor 475 and the memory 476 illustrated by FIG. 4 in the present disclosure.

In one embodiment, the second receiver 1302 comprises at least the first two of the antenna 420, the receiver 418, the multi-antenna receiving processor 472, the receiving processor 470, the controller/processor 475 and the memory 476 illustrated by FIG. 4 in the present disclosure.

The second transmitter 1301 transmits a first information block set; transmits a first signaling, the first signaling being used for indicating a first radio resource block, the first radio resource block comprising a positive integer number of resource sub-block(s); and transmitting a first signal.

The second receiver 1302 receives a first bit block in the first radio resource block.

In Embodiment 11, the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; when the first radio resource block only comprises one resource sub-block, only one information element of the first information element and the second information element is used for determining a spatial relation of the first radio resource block; when the first radio resource block comprises K resource sub-blocks and K is a positive integer greater than 1, the first information element is used for determining a spatial relation of at least one resource sub-block in the first radio resource block, and the second information element is used for determining a spatial relation of at least one resource sub-block in the first radio resource block.

In one embodiment, when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined.

In one embodiment, the first index is used for indicating the first information element, while the second index is used for indicating the second information element; the first information block set indicates a third index, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1.

In one embodiment, the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

In one embodiment, the second transmitter 1301 also transmits a third information block; herein, the third information block is used for indicating the M radio resource block sets.

In one embodiment, the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

In one embodiment, the second transmitter 1301 also transmits a fourth information block; herein, the fourth information block is used for indicating the N information elements.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) equipment, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) equipment, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) equipment, NB-IOT terminals, vehicle-mounted communication equipment, aircrafts, airplanes, unmanned aerial vehicles, telecontrolled aircrafts, etc. The base station or network side equipment includes but is not limited to macro-cellular base stations, micro-cellular base stations, home base stations, relay base station, eNB, gNB, Transmitter Receiver Point (TRP), GNSS, relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
 a first receiver, which receives a first information block set; receives a first signaling, the first signaling being Downlink Control Information (DCI), the first signaling comprising a first field, and the first field in the first signaling being used for indicating a first radio resource block, the first field in the first signaling being a PUCCH resource indicator field, the first radio resource block comprising a positive integer number of resource sub-block(s), a number of resource sub-block(s) comprised by the first radio resource block being equal to a number of repetition(s); and receives a first signal, the first signal being transmitted on a PDSCH; and
 a first transmitter, which transmits a first bit block in the first radio resource block;
 wherein the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; the first index is different from the second index, and the first index and the second index are both non-negative integers; the first information block set is carried by a MAC CE signaling, and the first information element and the second information element are activated by the same MAC CE for a same PUCCH group;

when the first radio resource block only comprises one resource sub-block, only one information element of the first information element and the second information element is used for determining a spatial relation of the first radio resource block; a second reference information element is one of the first information element and the second information element that corresponds to a smaller value between the first index and the second index, the second reference information element comprises a given reference signal, the given reference signal comprises one of a Channel State Information-Reference Signal (CSI-RS), a Sounding Reference Signal (SRS) or a Synchronization Signal/Physical Broadcast CHannel (SS/PBCH) Block, and the given reference signal is used for determining the spatial relation of the first radio resource block;

when the first radio resource block comprises K resource sub-blocks and K is a positive integer greater than 1, any two resource sub-blocks of the K resource sub-blocks are orthogonal in time domain, the first information element is used for determining a spatial relation of at least one resource sub-block in the first radio resource block, and the second information element is used for determining a spatial relation of at least one resource sub-block in the first radio resource block; a given resource block is any one of the K resource sub-blocks, and a given information element is either the first information element or the second information element; the given information element is used for determining a spatial relation of the given resource block comprises that the given information element comprises a given reference signal, and the given reference signal is used for determining a spatial relation of the given resource block, and the given reference signal comprises one of a CSI-RS, a SRS or a SS/PBCH Block.

2. The first node according to claim 1, wherein when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined;

a first resource sub-block is an earliest resource sub-block in the K resource sub-blocks, a first reference information element is one of the first information element and the second information element that corresponds to a smaller value between the first index and the second index, and the spatial relation of the first resource sub-block is determined by the first reference information element;

a first position set comprises the relative positions of the K resource sub-blocks, and the first position set comprises a first subset and a second subset, the first subset being orthogonal with the second subset; a given resource sub-block is any of the K resource sub-blocks other than the first resource sub-block; when the relative position of the given resource sub-block in the K resource sub-blocks belongs to the first subset, the spatial relation of the given resource sub-block and the spatial relation of the first resource sub-block are determined by a same information element of the first information element and the second information element; when the relative position of the given resource sub-block in the K resource sub-blocks belongs to the second subset, the spatial relation of the given resource sub-block and the spatial relation of the first resource sub-block are separately determined by different information elements of the first information element and the second information element.

3. The first node according to claim 1, wherein the first receiver also receives a third information block, the third information block being carried by an RRC signaling; wherein the third information block is used for indicating M radio resource block sets; the first index is used for indicating the first information element, while the second index is used for indicating the second information element; the first information block set indicates a third index, the third index is a non-negative integer, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1; the first information element and the second information element are activated for the first radio resource block set.

4. The first node according to claim 1, wherein the first receiver also receives a third information block, the third information block being carried by an RRC signaling; wherein the third information block is used for indicating M radio resource block sets; the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

5. The first node according to claim 1, wherein the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

6. A second node for wireless communications, comprising:

a second transmitter, which transmits a first information block set; transmits a first signaling, the first signaling being Downlink Control Information (DCI), the first signaling comprising a first field, and the first field in the first signaling being used for indicating a first radio resource block, the first field in the first signaling being a PUCCH resource indicator field, the first radio resource block comprising a positive integer number of resource sub-block(s), a number of resource sub-block(s) comprised by the first radio resource block being equal to a number of repetition(s); and receives a first signal, the first signal being transmitted on a PDSCH; and transmits a first signal, the first signal being transmitted on a PDSCH; and a second receiver, which receives a first bit block in the first radio resource block;

wherein the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; the first index is different from the second index, and the first index and the second index are both non-negative integers; the first information block set is carried by a MAC CE signaling, and the first information element and the second information element are activated by the same MAC CE for a same PUCCH group;

when the first radio resource block only comprises one resource sub-block, only one information element of the first information element and the second information element is used for determining a spatial relation of the first radio resource block; a second reference information element is one of the first information element and the second information element that corresponds to a smaller value between the first index and the second index, the second reference information element comprises a given reference signal, the given reference signal comprises one of a Channel State Information-Reference Signal (CSI-RS), a Sounding Reference Signal (SRS) or a Synchronization Signal/Physical Broadcast CHannel (SS/PBCH) Block, and the given reference signal is used for determining the spatial relation of the first radio resource block;

when the first radio resource block comprises K resource sub-blocks and K is a positive integer greater than 1, any two resource sub-blocks of the K resource sub-blocks are orthogonal in time domain, the first information element is used for determining a spatial relation of at least one resource sub-block in the first radio resource block, and the second information element is used for determining a spatial relation of at least one resource sub-block in the first radio resource block; a given resource block is any one of the K resource sub-blocks, and a given information element is either the first information element or the second information element; the given information element is used for determining a spatial relation of the given resource block comprises that the given information element comprises a given reference signal, and the given reference signal is used for determining a spatial relation of the given resource block, and the given reference signal comprises one of a CSI-RS, a SRS or a SS/PBCH Block.

7. The second node according to claim 6, wherein when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined;

a first resource sub-block is an earliest resource sub-block in the K resource sub-blocks, a first reference information element is one of the first information element and the second information element that corresponds to a smaller value between the first index and the second index, and the spatial relation of the first resource sub-block is determined by the first reference information element;

a first position set comprises the relative positions of the K resource sub-blocks, and the first position set comprises a first subset and a second subset, the first subset being orthogonal with the second subset; a given resource sub-block is any of the K resource sub-blocks other than the first resource sub-block; when the relative position of the given resource sub-block in the K resource sub-blocks belongs to the first subset, the spatial relation of the given resource sub-block and the spatial relation of the first resource sub-block are determined by a same information element of the first information element and the second information element; when the relative position of the given resource sub-block in the K resource sub-blocks belongs to the second subset, the spatial relation of the given resource sub-block and the spatial relation of the first resource sub-block are separately determined by different information elements of the first information element and the second information element.

8. The second node according to claim 6, wherein the second transmitter also transmits a third information block, the third information block being carried by an RRC signaling; wherein the third information block is used for indicating M radio resource block sets; the first index is used for indicating the first information element, while the second index is used for indicating the second information element; the first information block set indicates a third index, the third index is a non-negative integer, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1; the first information element and the second information element are activated for the first radio resource block set.

9. The second node according to claim 6, wherein the second transmitter also transmits a third information block, the third information block being carried by an RRC signaling; wherein the third information block is used for indicating M radio resource block sets; the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

10. The second node according to claim 6, wherein the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

11. A method in a first node for wireless communications, comprising:
receiving a first information block set;
receiving a first signaling, the first signaling being Downlink Control Information (DCI), the first signaling comprising a first field, and the first field in the first signaling being used for indicating a first radio resource block, the first field in the first signaling being a PUCCH resource indicator field, the first radio resource block comprising a positive integer number of resource sub-block(s), a number of resource sub-block(s) comprised by the first radio resource block being equal to a number of repetition(s); and receives a first signal, the first signal being transmitted on a PDSCH;
receiving a first signal, the first signal being transmitted on a PDSCH; and
transmitting a first bit block in the first radio resource block;
wherein the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; the first index is different from the second index, and the first index and the second index are both non-negative integers; the first information block set is carried by a MAC CE signaling, and the first information element and the second information element are activated by the same MAC CE for a same PUCCH group;
when the first radio resource block only comprises one resource sub-block, only one information element of the first information element and the second information element is used for determining a spatial relation of the first radio resource block; a second reference information element is one of the first information element and the second information element that corresponds to a smaller value between the first index and the second index, the second reference information element comprises a given reference signal, the given reference signal comprises one of a Channel State Information-Reference Signal (CSI-RS), a Sounding Reference Signal (SRS) or a Synchronization Signal/Physical Broadcast CHannel (SS/PBCH) Block, and the given reference signal is used for determining the spatial relation of the first radio resource block;
when the first radio resource block comprises K resource sub-blocks and K is a positive integer greater than 1, any two resource sub-blocks of the K resource sub-blocks are orthogonal in time domain, the first information element is used for determining a spatial relation of at least one resource sub-block in the first radio resource block, and the second information element is used for determining a spatial relation of at least one resource sub-block in the first radio resource block; a given resource block is any one of the K resource sub-blocks, and a given information element is either the first information element or the second information element; the given information element is used for determining a spatial relation of the given resource block comprises that the given information element comprises a given reference signal, and the given reference signal is used for determining a spatial relation of the given resource block, and the given reference signal comprises one of a CSI-RS, a SRS or a SS/PBCH Block.

12. The method according to claim 11, wherein when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined;
a first resource sub-block is an earliest resource sub-block in the K resource sub-blocks, a first reference information element is one of the first information element and the second information element that corresponds to a smaller value between the first index and the second index, and the spatial relation of the first resource sub-block is determined by the first reference information element;
a first position set comprises the relative positions of the K resource sub-blocks, and the first position set comprises a first subset and a second subset, the first subset being orthogonal with the second subset; a given resource sub-block is any of the K resource sub-blocks other than the first resource sub-block; when the relative position of the given resource sub-block in the K resource sub-blocks belongs to the first subset, the spatial relation of the given resource sub-block and the spatial relation of the first resource sub-block are determined by a same information element of the first information element and the second information element; when the relative position of the given resource sub-block in the K resource sub-blocks belongs to the second subset, the spatial relation of the given resource sub-block and the spatial relation of the first resource sub-block are separately determined by different information elements of the first information element and the second information element.

13. The method according to claim 11, comprising:
receiving a third information block, the third information block being carried by an RRC signaling; wherein the third information block is used for indicating M radio resource block sets; the first index is used for indicating the first information element, while the second index is used for indicating the second information element; the first information block set indicates a third index, the third index is a non-negative integer, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1; the first information element and the second information element are activated for the first radio resource block set.

14. The method according to claim 11, comprising: receiving a third information block, the third information block being carried by an RRC signaling; wherein the third information block is used for indicating M radio resource block sets; the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

15. The method according to claim 11, wherein the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

16. A method in a second node for wireless communications, comprising:
transmitting a first information block set;
transmitting a first signaling, the first signaling being Downlink Control Information (DCI), the first signaling comprising a first field, and the first field in the first signaling being used for indicating a first radio resource block, the first field in the first signaling being a PUCCH resource indicator field, the first radio resource block comprising a positive integer number of resource sub-block(s);
transmitting a first signal, the first signal being transmitted on a PDSCH; and
receiving a first bit block in the first radio resource block;
wherein the first signaling is used for indicating scheduling information of the first signal, and the first bit block is used for indicating whether the first signal is correctly received; the first information block set is used for activating a first information element and a second information element from N information elements, with the first information element corresponding to a first index, and the second information element corresponding to a second index, N being a positive integer greater than 1; the first index is different from the second index, and the first index and the second index are both non-negative integers; the first information block set is carried by a MAC CE signaling, and the first information element and the second information element are activated by the same MAC CE for a same PUCCH group;
when the first radio resource block only comprises one resource sub-block, only one information element of the first information element and the second information element is used for determining a spatial relation of the first radio resource block; a second reference information element is one of the first information element and the second information element that corresponds to a smaller value between the first index and the second index, the second reference information element comprises a given reference signal, the given reference signal comprises one of a Channel State Information-Reference Signal (CSI-RS), a Sounding Reference Signal (SRS) or a Synchronization Signal/Physical Broadcast CHannel (SS/PBCH) Block, and the given reference signal is used for determining the spatial relation of the first radio resource block;
when the first radio resource block comprises K resource sub-blocks and K is a positive integer greater than 1, any two resource sub-blocks of the K resource sub-blocks are orthogonal in time domain, the first information element is used for determining a spatial relation of at least one resource sub-block in the first radio resource block, and the second information element is used for determining a spatial relation of at least one resource sub-block in the first radio resource block; a given resource block is any one of the K resource sub-blocks, and a given information element is either the first information element or the second information element; the given information element is used for determining a spatial relation of the given resource block comprises that the given information element comprises a given reference signal, and the given reference signal is used for determining a spatial relation of the given resource block, and the given reference signal comprises one of a CSI-RS, a SRS or a SS/PBCH Block.

17. The method according to claim 16, wherein when the first radio resource block comprises the K resource sub-blocks, a relative magnitude of the first index and the second index and relative positions of the K resource sub-blocks are used for determining by which one of the first information element and the second information element the spatial relations of the K resource sub-blocks are respectively determined;
a first resource sub-block is an earliest resource sub-block in the K resource sub-blocks, a first reference information element is one of the first information element and the second information element that corresponds to a smaller value between the first index and the second index, and the spatial relation of the first resource sub-block is determined by the first reference information element;
a first position set comprises the relative positions of the K resource sub-blocks, and the first position set comprises a first subset and a second subset, the first subset being orthogonal with the second subset; a given resource sub-block is any of the K resource sub-blocks other than the first resource sub-block; when the relative position of the given resource sub-block in the K resource sub-blocks belongs to the first subset, the spatial relation of the given resource sub-block and the spatial relation of the first resource sub-block are determined by a same information element of the first information element and the second information element; when the relative position of the given resource sub-block in the K resource sub-blocks belongs to the second subset, the spatial relation of the given resource sub-block and the spatial relation of the first resource sub-block are separately determined by different information elements of the first information element and the second information element.

18. The method according to claim 16, comprising: transmitting a third information block, the third information block being carried by an RRC signaling; wherein the third information block is used for indicating M radio resource block sets; the first index is used for indicating the first information element, while the second index is used for indicating the second information element; the first information block set indicates a third index, the third index is a non-negative integer, and the third index is used for indicating a first radio resource block set out of the M radio resource block sets, the first radio resource block set comprising the first radio resource block, and any radio resource block set of the M radio resource block sets comprises a positive integer number of radio resource block(s), M being a positive integer greater than 1; the first information element and the second information element are activated for the first radio resource block set.

19. The method according to claim 16, comprising: transmitting a third information block, the third information block being carried by an RRC signaling; wherein the third information block is used for indicating M radio resource block sets; the first information block set comprises a first information block and a second information block, of which the first information block indicates the first index and the first information element, while the second information block indicates the second index and the second information element; the first index is used for indicating a second radio resource block set out of the M radio resource block sets, while the second index is used for indicating a third radio resource block set out of the M radio resource block sets, both the second radio resource block set and the third radio resource block set comprise the first radio resource block, and any radio resource block set of the M radio resource block sets comprises a positive integer number of radio resource block(s), M being a positive integer greater than 1.

20. The method according to claim 16, wherein the first information element indicates a first power control parameter group, and the second information element indicates a second power control parameter group; a given information element is one of the first information element and the second information element that is used for determining the spatial relation of a given resource block, and one of the first power control parameter group and the second power control parameter group that is indicated by the given information element is used for determining a transmitting power of the given resource block; when the first radio resource block comprises only one resource sub-block, the given resource block is the first radio resource block; when the first radio resource block comprises the K resource sub-blocks, the given resource block is any one of the K resource sub-blocks.

* * * * *